(12) United States Patent
Martin et al.

(10) Patent No.: US 9,240,598 B2
(45) Date of Patent: Jan. 19, 2016

(54) SEAL FOR SOLID POLYMER ELECTROLYTE FUEL CELL

(71) Applicant: Ballard Power Systems Inc., Burnaby (CA)

(72) Inventors: Keith M. Martin, Westmount (CA); Samira Barakat, Vancouver (CA); Emerson R. Gallagher, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 14/452,989

(22) Filed: Aug. 6, 2014

(65) Prior Publication Data

US 2015/0030960 A1 Jan. 29, 2015

Related U.S. Application Data

(62) Division of application No. 13/133,445, filed as application No. PCT/US2009/068326 on Dec. 16, 2009, now Pat. No. 8,828,617.

(60) Provisional application No. 61/139,238, filed on Dec. 19, 2008.

(51) Int. Cl.
*H01M 8/02* (2006.01)
*H01M 8/10* (2006.01)
*H01M 8/24* (2006.01)

(52) U.S. Cl.
CPC .......... *H01M 8/0273* (2013.01); *H01M 8/0284* (2013.01); *H01M 8/1002* (2013.01); *H01M 8/1004* (2013.01); *H01M 8/245* (2013.01); *H01M 8/028* (2013.01); *H01M 8/0276* (2013.01); *H01M 8/0286* (2013.01); *H01M 2008/1095* (2013.01); *H01M 2300/0082* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 5,464,700 A | 11/1995 | Steck et al. | |
| 6,057,054 A | 5/2000 | Barton et al. | |
| 6,261,711 B1 * | 7/2001 | Matlock | H01M 8/0247 |
| | | | 429/513 |
| 6,783,883 B1 | 8/2004 | Koschany | |
| 6,815,115 B2 | 11/2004 | Sugita et al. | |
| 2002/0106954 A1 | 8/2002 | Sakumoto | |
| 2002/0122970 A1 | 9/2002 | Inoue et al. | |
| 2004/0101735 A1 | 5/2004 | Wells et al. | |
| 2004/0137308 A1 | 7/2004 | Maeda et al. | |

FOREIGN PATENT DOCUMENTS

| | | |
|---|---|---|
| EP | 1 246 281 A1 | 10/2002 |
| JP | 2148570 A | 6/1990 |
| JP | 2001336640 A | 12/2001 |
| JP | 2001351651 A | 12/2001 |
| JP | 2006-210234 A | 8/2006 |
| WO | WO 01/29921 A1 | 4/2001 |

\* cited by examiner

*Primary Examiner* — Ula C Ruddock
*Assistant Examiner* — Matthew Van Oudenaren
(74) *Attorney, Agent, or Firm* — Seed IP Law Group PLLC

(57) ABSTRACT

In solid polymer fuel cells employing framed membrane electrode assemblies, a conventional anode compliant seal is employed in combination with a cathode non-compliant seal to provide for a thinner fuel cell design, particularly in the context of a fuel cell stack. This approach is particularly suitable for fuel cells operating at low pressure.

3 Claims, 2 Drawing Sheets

SEAL FOR SOLID POLYMER ELECTROLYTE FUEL CELL

BACKGROUND

1. Technical Field

The present invention relates to seal designs for solid polymer electrolyte fuel cells.

2. Description of the Related Art

Fuel cells are devices in which fuel and oxidant fluids electrochemically react to generate electricity. A type of fuel cell being developed for various commercial applications is the solid polymer electrolyte fuel cell, which employs a membrane electrode assembly (MEA) comprising a solid polymer electrolyte made of a suitable ionomer material (e.g., Nafion®) disposed between two electrodes. Each electrode comprises an appropriate catalyst located next to the solid polymer electrolyte. The catalyst may be, for example, a metal black, an alloy, or a supported metal catalyst such as platinum on carbon. The catalyst may be disposed in a catalyst layer, and the catalyst layer typically contains ionomer, which may be similar to that used for the solid polymer electrolyte. A fluid diffusion layer (a porous, electrically conductive sheet material) is typically employed adjacent to the electrode for purposes of mechanical support, current collection, and/or reactant distribution. In the case of gaseous reactants, the fluid diffusion layer is referred to as a gas diffusion layer. If a catalyst layer is incorporated onto a gas diffusion layer, the unit is referred to as a gas diffusion electrode.

For commercial applications, a plurality of fuel cells are generally stacked in series in order to deliver a greater output voltage. Separator plates are typically employed adjacent the gas diffusion electrode layers in solid polymer electrolyte fuel cells to separate one cell from another in a stack. Fluid distribution features, including inlet and outlet ports, fluid distribution plenums and numerous fluid channels, are typically formed in the surface of the separator plates adjacent the electrodes in order to distribute reactant fluids to, and remove reaction by-products from, the electrodes. Separator plates also provide a path for electrical and thermal conduction, as well as mechanical support and dimensional stability to the MEA.

In an assembled fuel cell, the porous gas diffusion layers in the MEA must be adequately sealed at their periphery and to their adjacent separator plates in order to prevent reactant gases from leaking over to the wrong electrode or to prevent leaks between the reactant gases and the ambient atmosphere surrounding the fuel cell stack. This can be challenging because the MEA is typically a relatively large, thin sheet. Thus, a seal may be needed over a significant perimeter, and a fuel cell stack typically involves sealing numerous MEAs. The design of the MEA edge seal should provide for production in high volume and for reliable, high quality leak tight seals. Various ways of accomplishing this have been suggested in the art.

One such sealing method involves the use of a sealing gasket which surrounds the MEA, and which can be significantly compressed between the anode and cathode separator plates in order to effect a reliable seal between the MEA and ambient. A seal separating the anode from the cathode can be obtained by impregnating gasket seal material into the edges of the MEA and attaching or integrating these impregnated edges to the surrounding gasket. U.S. Pat. No. 6,057,054 discloses such an embodiment using flush-cut MEAs in which the edges of the membrane electrolyte, electrodes, and gas diffusion layers are aligned and terminate at the same location (i.e., at the flush cut edge). However, such an approach generally requires the same material to be used for edge impregnant as well as the gasket, and further can require tight tolerances and hence production difficulties.

Alternatively, a frame may be applied to the edge of the MEA which, in turn, is sealingly attached or bonded to the surrounding compressible gasket. In this embodiment, the electrolyte in the MEA typically extends slightly beyond the edges of the anode and cathode. The frame employed typically comprises two thin pieces applied to the edges on either side of the MEA. The frame pieces have little compressibility and essentially seal to the edge of the membrane electrolyte, thereby separating the anode from the cathode. EP1246281 discloses such an embodiment in which a frame is bonded to a surrounding, significantly compressible elastomer gasket (e.g., 1 mm thick polyisobutylene).

Other sealing methods employ more than one compressible gasket to effect the required seals. For instance, embodiments employing framed MEAs have been suggested in which the frames are not bonded to a surrounding single gasket, but are instead sandwiched between two surrounding compressible gaskets. Thus, one surrounding gasket seals an anode between the anode frame and the adjacent separator plate, while the other surrounding gasket seals the cathode between the cathode frame and its adjacent separator plate. Difficulties can arise, however, if the opposing gaskets are out of alignment with respect to each other, and tight tolerances are again required. Still further embodiments have been suggested which employ two compressible gaskets that do not employ frames on the MEAs in order to effect the desired seals. For instance, U.S. Pat. No. 6,815,115 discloses various embodiments in which one compressible gasket seal is made directly to the membrane electrolyte in the MEA, while the other gasket seal is used to make a seal between the edges of the adjacent separator plates. Here, the two gaskets are offset and so misalignment is not as much of an issue.

In all these prior embodiments, a sufficiently compressible, compliant seal is employed to seal both the anode and the cathode from the surrounding environment. However, in order to increase power density, attempts continue to be made to reduce the thickness of the individual cells making up a fuel cell stack. As fuel cell makers successfully reduce the thickness of the other components in the cells, the seal design now represents a significant limitation on further reductions in thickness. Consequently, there remains a need in the art for improved sealing methods and designs. The present invention fulfills this need and provides further related advantages.

BRIEF SUMMARY

In certain applications, it has been found acceptable to relax the quality of the seal on the oxidant (air) side of the fuel cell and thereby allow for a simpler, thinner seal design. The design replaces a thicker and significantly more compressible seal on the oxidant side with a thinner and relatively incompressible seal, and thus results in a higher leak rate. However, the amount leaked is lower in applications having lower operating pressures (e.g., less than 5 psig), and the consequences are not generally significant for small leaks between the oxidant side of the fuel cell and the surrounding ambient environment. The design allows for a thinner seal and hence thinner cell when using framed membrane electrode assemblies. Also, use of a non-compliant seal avoids the seal to seal alignment issues found with some prior art constructions.

The invention is applicable to solid polymer electrolyte fuel cells having a membrane electrode assembly comprising an ionomer electrolyte disposed between an anode and a cathode, an anode fluid diffusion layer adjacent the anode, and a cathode fluid diffusion layer adjacent the cathode. The electrolyte in the membrane electrode assembly extends beyond the edges of the anode, cathode, and diffusion layers. The fuel cell also comprises an anode separator plate adjacent the anode fluid diffusion layer, a cathode separator plate adjacent the cathode fluid diffusion layer, and a frame around the periphery of the MEA. The frame comprises an anode frame piece attached at its inner periphery to the edge of the anode fluid diffusion layer and at its outer periphery to the extended electrolyte, and a cathode frame piece attached at its inner periphery to the edge of the cathode fluid diffusion layer and at its outer periphery to the extended electrolyte.

Seals are provided at the edge of the framed membrane electrode assembly for fluidly separating the anode from the cathode, and for fluidly separating both the anode and the cathode from the surrounding environment. The seals consist essentially of a compliant seal between the anode frame piece and the anode separator plate, and a non-compliant seal between the cathode frame piece and the cathode separator plate. Therefore, there is no compliant seal separating the oxidant/air side of the fuel cell stack from the surrounding atmosphere. However, there is a compliant seal separating the fuel side of the stack from both the oxidant side and the surrounding atmosphere. The compliant seal may be compressed significantly (e.g., 15-50% or 30-50% in thickness, depending on the seal material.)

The non-compliant seal can be obtained with no additional components and essentially arises from the absence of a conventional compliant seal between the cathode frame piece and the cathode separator plate. In this instance, the non-compliant seal is made at the interface between the cathode frame piece and the cathode separator plate.

Alternatively, an additional non-compliant component (e.g., a film of elastomer or pressure sensitive adhesive) may be used to enhance the quality of the non-compliant seal.

The invention can be used in fuel cell embodiments with otherwise conventional components (e.g., thermoplastic sheet frame pieces made of polyimide or polyethylene naphthalate, a compliant gasket seal made of silicone-based elastomer, and separator plates made of carbon).

A plurality of the fuel cells may be assembled in a series stack to make a fuel cell stack. Such a stack may employ bipolar plates, in which the anode separator plate of one fuel cell in the stack is unitary with the cathode plate of the adjacent fuel cell in the stack.

These and other aspects of the invention will be evident in view of the attached figures and the following detailed description.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is, as "including but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Herein, the terms compliant and non-compliant are used to classify seals according to how much they compress under a given load. A seal is considered compliant in a particular situation if it compresses at least 50 micrometers between flat plates under a stress of about 50 psi. As this is a displacement based definition, a compressible elastomer may still be non-compliant if employed in a very thin sheet. In a like manner, a film of adhesive is considered non-compliant even though a very thick layer might be displaced readily under load. Compliance is thus not only a function of material, but also of dimension and shape. A seal that is very compliant would be one that compresses over 10 times this amount and one that is very non-compliant would be one that compresses less than that amount, for example, less than 10 times that amount.

Figure 1A:
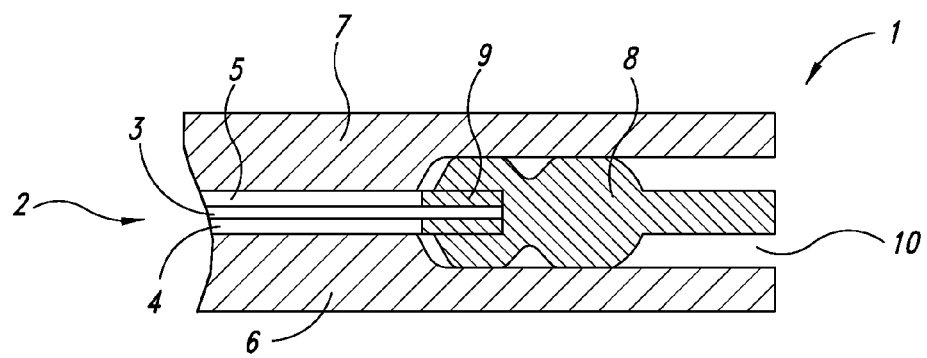
FIG. 1a is a schematic cross section drawing of the seal section of a prior art solid polymer electrolyte fuel cell that employs a gasket attached to and impregnated into an edge portion of the MEA.
Figure 1B:
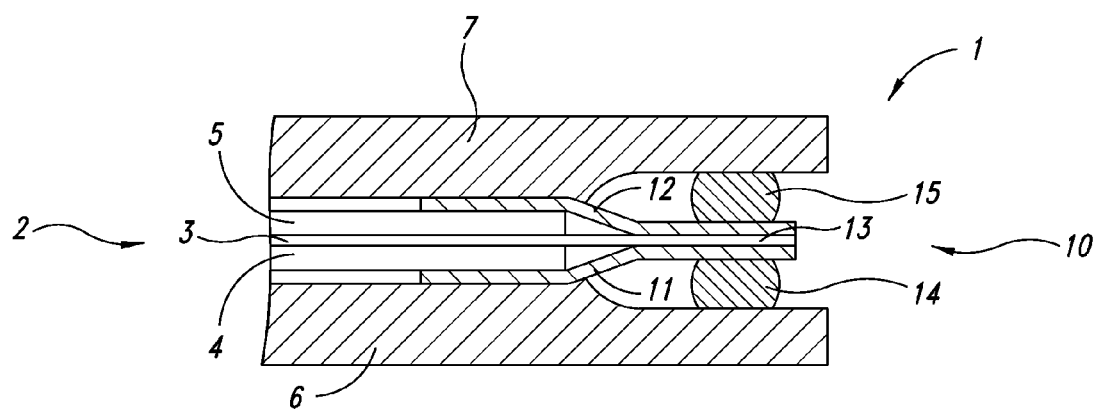
FIG. 1b is a schematic cross section drawing of the seal section of a prior art solid polymer electrolyte fuel cell that employs a framed MEA and two gaskets on opposite sides of the frame.

FIGS. 1a and 1b are schematic cross section drawings of the seal sections of prior art solid polymer electrolyte fuel cells and illustrate how compliant seals are used to seal both the anode and the cathode from the surrounding environment and from each other.

In both Figures, fuel cell 1 comprises membrane electrode assembly "MEA" 2 which in turn comprises ionomer electrolyte 3, anode and adjacent anode fluid diffusion layer 4 (appearing as a unit in these Figures), and cathode and adjacent cathode fluid diffusion layer 5 (appearing as a unit in these Figures). Fuel cell 1 also comprises anode separator plate 6 and cathode separator plate 7.

In FIG. 1a, MEA 2 is "flush-cut" (i.e., the components making up the assembly all terminate together). (Typically, this is a result of cutting the assembly to the desired size after the components have been laminated together.) Very compliant gasket 8 is attached to and impregnated into edge portion 9 of MEA 2. Anode and cathode separator plates 6, 7 compress gasket 8 quite substantially and thereby form effective seals that separate both the anode and cathode from surrounding ambient atmosphere 10. A seal separating anode 4 and cathode 5 from each other is formed via attaching and impregnating gasket 8 at edge portion 9.

In FIG. 1b, electrolyte 3 extends beyond the edges of the rest of MEA 2 (i.e., beyond anode, cathode, and adjacent anode fluid diffusion layers 4, 5). Here, MEA 2 is framed at its edges between anode frame piece 11 and cathode frame piece 12. Frame pieces 11, 12 are bonded to electrolyte 3 at 13. Two very compliant gaskets 14, 15 are used on opposite sides of the frame to seal the framed edge of MEA 2 to adjacent anode and cathode separator plates 6, 7 respectively. Again, the separator plates compress gaskets 14 and 15 quite substantially in order to create effective seals that separate both the anode and cathode from surrounding ambient atmosphere 10. The framed extended electrolyte at the edge of MEA 2 serves to seal anode 4 and cathode 5 from each other.

Figure 2:
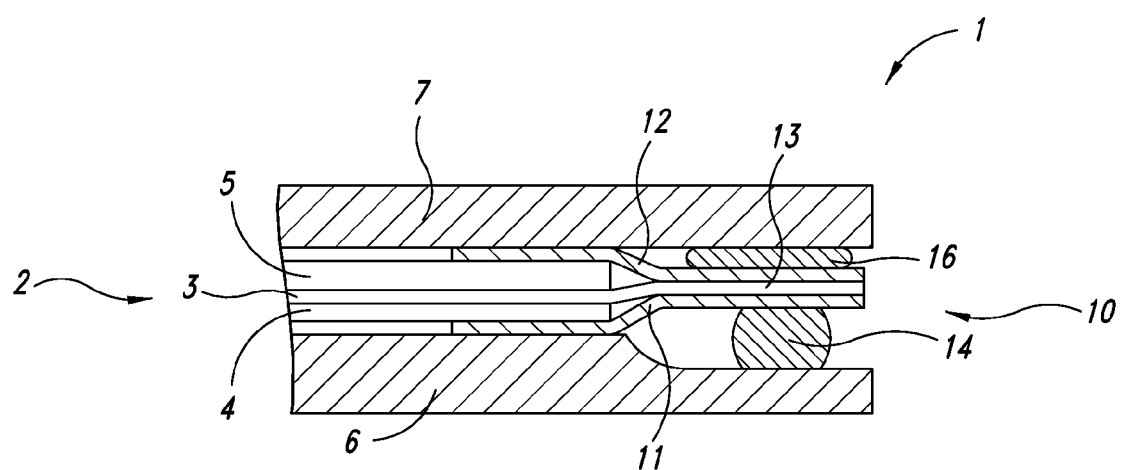
FIG. 2 is a schematic cross section drawing of the seal section of a representative fuel cell of the invention that employs a framed MEA and both a compliant and a non-compliant seal.

In a fuel cell of the invention, however, the overall cell thickness can be reduced and the seal construction simplified while still being able to maintain an acceptable seal. FIG. 2 shows a schematic cross section drawing of the seal section of such a representative fuel cell. The embodiment in FIG. 2 employs a framed MEA and both a compliant and a non-compliant seal.

In FIG. 2, like numerals are used to identify the same components that appear in FIG. 1b. The non-compliant seal is identified as component 16. However, in one embodiment, non-compliant seal 16 refers to the absence of gasket 15. In this embodiment, no other sealing component is employed and the seal is made between the surfaces of cathode fluid diffusion layer 5 and cathode separator plate 7. Closing force is provided by very compressed gasket 14 on the other side of the framed MEA. In another embodiment, non-compliant seal 16 may include an optional thin film of some suitable elastomer material (such as, but not limited to, silicone) or pressure sensitive adhesive (e.g., such as, but not limited to, 3M 467MP) in order to improve the quality of the seal (i.e., reduce leak rate). The optional film is quite thin in comparison to gaskets 14, 15.

Although replacing gasket 15 of FIG. 1b with a non-compliant seal results in a relatively poorer seal and higher leak rate, this can still be acceptable on the oxidant or air side of the fuel cell. Small leaks between the oxidant side and ambient do not affect fuel cell performance significantly or represent any safety issues with regard to the surrounding environment. An acceptable cathode leak rate may be, for example, less than 10% of the oxidant stoichiometry during fuel cell operation at a given load, for instance, less than 5% of the oxidant stoichiometry during fuel cell operation at a given load.

The simplified thinner seal design is suited for use with various solid polymer electrolyte fuel cell constructions. The following examples are provided to illustrate certain aspects and embodiments of the invention but should not be construed as limiting in any way.

EXAMPLES

A five-cell solid polymer electrolyte fuel cell stack was assembled using cells with framed membrane electrode assemblies. The cell design was similar to that shown in FIG. 2. The membrane electrode assemblies had Kapton sheet frames attached to the edges with 3M 467MP pressure sensitive adhesive. Single compliant silicon elastomer gaskets were employed between the anode frame pieces and the anode separator plates. No gaskets or additional sealing components were employed between the cathode frame pieces and the cathode separator plates.

The stack was then leak tested when first assembled (dry state) and after it had been warmed up and was operating on a humidified air oxidant supply (wet state). In both instances, the leak testing pressure was 20 psi. The leak rates were 76 cc/m and 16 cc/m for the dry and wet states, respectively. This is considered acceptable for commercial purposes.

In addition, over 10 more stacks having a similar configuration to the preceding five-cell fuel cell stack, but averaging more than 80 cells per stack and using PEN (polyethylene naphthalate) sheet frames with a thermoplastic adhesive, were also leak tested after operation. The cathode leak rates represented less than 0.01 stoichiometry loss when measured at 1.6 times the nominal cathode operating pressure.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

The invention claimed is:

1. A method of sealing a solid polymer electrolyte fuel cell, the fuel cell comprising a membrane electrode assembly comprising an ionomer electrolyte disposed between an anode and a cathode, an anode fluid diffusion layer adjacent the anode, and a cathode fluid diffusion layer adjacent the cathode wherein the electrolyte extends beyond the edges of the anode, cathode, and diffusion layers; anode and cathode separator plates adjacent the anode and cathode fluid diffusion layers respectively; a frame around the periphery of the membrane electrode assembly comprising an anode frame piece attached at its inner periphery to the edge of the anode fluid diffusion layer and at its outer periphery to the extended electrolyte, and a cathode frame piece attached at its inner periphery to the edge of the cathode fluid diffusion layer and at its outer periphery to the extended electrolyte; the method comprising:
   providing a compliant seal between the anode frame piece and the anode separator plate; and
   providing a non-compliant seal between the cathode frame piece and the cathode separator plate;
   wherein the non-compliant seal has a leak rate to the surrounding environment that is higher than that of the compliant seal.

2. The method of claim 1 wherein the non-compliant seal comprises a film of elastomer or pressure sensitive adhesive.

3. The method of claim 1 wherein the non-compliant seal is the interface between the cathode frame piece and the cathode separator plate.

* * * * *